(12) United States Patent
Kidani et al.

(10) Patent No.: US 7,276,460 B2
(45) Date of Patent: Oct. 2, 2007

(54) LOW TEMPERATURE SINTERING CERAMIC COMPOSITION FOR USE IN HIGH FREQUENCY, METHOD OF FABRICATING THE SAME AND ELECTRONIC COMPONENT

(75) Inventors: Naoki Kidani, Ishikawa (JP); Kiyoshi Mizushima, Ishikawa (JP); Mikio Takimoto, Ishikawa (JP)

(73) Assignee: Nikko Company, Hakusan-Shi, Ishikawa-Ken (JP)

( * ) Notice: Subject to any disclaimer, the term of this patent is extended or adjusted under 35 U.S.C. 154(b) by 55 days.

(21) Appl. No.: 10/540,014

(22) PCT Filed: Dec. 24, 2003

(86) PCT No.: PCT/JP03/16559

§ 371 (c)(1),
(2), (4) Date: Jun. 22, 2005

(87) PCT Pub. No.: WO2004/060829

PCT Pub. Date: Jul. 22, 2004

(65) Prior Publication Data
US 2006/0058170 A1 Mar. 16, 2006

(30) Foreign Application Priority Data
Dec. 27, 2002 (JP) ............................. 2002-380096

(51) Int. Cl.
*C04B 35/20* (2006.01)
(52) U.S. Cl. .................. 501/108; 501/122; 428/210
(58) Field of Classification Search ................ 501/108, 501/122; 428/210
See application file for complete search history.

(56) References Cited

U.S. PATENT DOCUMENTS
5,763,059 A  6/1998  Yamaguchi et al.
6,232,251 B1  5/2001  Terashi et al.

FOREIGN PATENT DOCUMENTS
| JP | 6333429 | 12/1994 |
| JP | 7033516 | 2/1995 |
| JP | 20000307661 | * 2/2000 |
| JP | 2001240470 | 9/2001 |
| JP | 2002173367 | 6/2002 |
| JP | 2003238235 | 8/2003 |
| JP | 2004115295 | * 4/2004 |

OTHER PUBLICATIONS

Machine translation of 2003238235, publication date Aug. 27, 2003.*

* cited by examiner

*Primary Examiner*—Karl Group
(74) *Attorney, Agent, or Firm*—Stevens Davis Miller & Mosher, L.L.P.

(57) ABSTRACT

A low temperature sintering ceramic composition that can be sintered at a temperature equal to or less than 1000° C. and has low dielectric constant and dielectric loss in a high frequency region of 17 Ghz or more, an electronic component using the same and a method of fabricating the low temperature sintering ceramic are provided. The composition comprises MgO and $SiO_2$ in sum total in the range of from 64.0 to 99.2% by mass; $Bi_2O_3$ in the range of from 0.4 to 33.0% by mass; $Li_2O$ in the range of from 0.4 to 3.0% by mass; and MgO and $SiO_2$ are contained in the molar ratio of from 2:1 to 2:3.5, at least part thereof being contained as a complex oxide of Mg and Si.

11 Claims, No Drawings

LOW TEMPERATURE SINTERING CERAMIC COMPOSITION FOR USE IN HIGH FREQUENCY, METHOD OF FABRICATING THE SAME AND ELECTRONIC COMPONENT

This application is a 35 U.S.C. §371 U.S. National Stage Application of International Application No. PCT/JP2003/016559, filed on Dec. 24, 2003, claiming the priority of Japanese Application No. 2002-380096, filed Dec. 27, 2002, the entire disclosures of which are incorporated herein by reference in their entireties.

TECHNICAL FIELD

The present invention relates to a low temperature sintering ceramic (porcelain) composition that is low in the dielectric constant and the dielectric loss and an electronic component using the same and a method of fabricating the low temperature sintering ceramic.

BACKGROUND ART

In recent years, in facing with an advanced information age, higher speed, higher integration and higher density packaging are demanded for semiconductor devices. In order to attain a higher speed in the semiconductor devices, in addition to shortening a wiring length and so on, it is indispensable to increase the signal propagation velocity on a circuit; in this connection, the signal propagation velocity is in inverse proportion to a square root of the dielectric constant of a substrate material; accordingly, a substrate material lower in the dielectric constant is necessary. Furthermore, in order to attain the higher integration and the higher density packaging, wiring materials low in the specific resistance (Ag, Au, Cu and so on) are demanded to use; however, since these metals are low in the melting point, in a multi-layered printed wiring board or the like in which after a wiring pattern is printed a substrate is sintered, it is necessary to use a substrate material capable of sintering at low temperatures. Accordingly, since alumina substrates (dielectric constant: from 9 to 9.5, sintering temperature: substantially 1500° C.) that have been so far widely used as a substrate material for use in electronic components are not suitable for high frequency printed circuit boards, in place of this, a material that is lower in the dielectric constant and capable of sintering at low temperatures is in demand. In addition, lower loss in microwave and millimeter wave regions is also in demand.

In this connection, recently, as a low dielectric constant substrate material capable of coping with higher speeds, a glass ceramic material made of glass and inorganic filler is under study. This kind of glass ceramic material, being such low in the dielectric constant as substantially from 3 to 7, is suitable for insulating substrates for use in high frequency, and in addition to the above, being capable of sintering at temperatures from 800 to 1000° C., is advantageously capable of sintering simultaneously with Ag, Au, Cu and so on low in the conductor resistance.

For instance, in JP-A-2000-188017 (U.S. Pat. No. 6,232,251), a ceramic composition for use in high frequency that includes a glass phase capable of precipitating a diopside ($CaMgSi_2O_6$) type crystal phase and an oxide containing Mg and/or Zn and Ti as the filler and is capable of sintering at a temperature equal to or less than 1000° C. is disclosed. Furthermore, in JP-A-2001-240470, a printed wiring board for use in high frequency that is made of a crystallized glass component containing $SiO_2$, $Al_2O_3$, MO (M denotes an alkaline earth metal element) and Pb and a kind of filler selected from a group of $Al_2O_3$, $SiO_2$, $MgTiO_3$, $(Mg,Zn)TiO_3$, $TiO_2$, $SrTiO_3$, $MgAl_2O_4$, $ZnAl_2O_4$, cordierite, mullite, enstatite, willemite, $CaAl_2Si_2O_3$, $SrAl_2Si_2O_8$, $(Sr, Ca)Al_2Si_2O_8$ and forsterite is disclosed.

In addition, low temperature sintering ceramic compositions in which boron (B) is used as a sintering aide has been proposed (See JP-A-2002-037661, JP-A-2002-173367, etc.).

However, the conventional glass ceramic material, though low in the dielectric constant, is such high as $20 \times 10^{-4}$ or more in the dielectric loss (tan δ) in a high frequency region of a signal frequency of 10 GHz or more, that is, substantially in the range of from $5 \times 10^3$ to $8 \times 10^3$ in terms of the Qf value; accordingly, it does not have the characteristics enough to put into practical use as the substrate material for high frequency. For example, the ceramic composition of JP-A-2000-037661 has a Qf value of at most $0.5 \times 10^3$ and the composition of JP-A-2002-173367 has a Qf value on the order of $5 \times 10^3$. The Qf value here denotes a product of a measurement frequency (f/GHz) and Q ($\cong 1/\tan δ$).

Accordingly, the present invention intends to provide a low temperature sintering ceramic composition that can be sintered simultaneously with a low resistance metal such as Ag, Au, Cu or the like and realize low dielectric constant and the low dielectric loss in a high frequency region, and a fabricating method of the low temperature sintering ceramic.

DISCLOSURE OF THE INVENTION

The present inventors, after studying hard to overcome the problems, found that a composition in which $Bi_2O_3$ and $Li_2O$ are added at particular ratios to a complex oxide containing Mg and Si can be sintered at a temperature in the range of substantially from 850 to 1000° C., and a low temperature sintering ceramic obtained by sintering such a composition has low dielectric constant and low dielectric loss, and thereby the present invention is accomplished.

That is, the present invention provides the following low temperature sintering ceramic composition, electronic components using the same and method of fabricating low temperature sintering ceramics.

(1) A low temperature sintering ceramic composition containing Mg, Si, Bi and Li as constituent elements, wherein the composition comprises MgO and $SiO_2$ in sum total in the range of from 64.0 to 99.2% by mass;

$Bi_2O_3$ in the range of from 0.4 to 33.0% by mass;

$Li_2O$ in the range of from 0.4 to 3.0% by mass; and

MgO and $SiO_2$ are contained in the molar ratio of from 2:1 to 2:3.5, at least part thereof being contained as a complex oxide of Mg and Si.

(2) The low temperature sintering ceramic composition according to above 1, wherein the composition comprises MgO and $SiO_2$ in sum total in the range of from 75.0 to 98.0% by mass;

$Bi_2O_3$ in the range of from 1.5 to 24.5% by mass;

$Li_2O$ in the range of from 0.5 to 3.0% by mass.

(3) The low temperature sintering ceramic composition according to above 1 or 2, wherein the complex oxide is a forsterite system crystal phase and/or enstatite system crystal phase; and at least part of $Bi_2O_3$ and $Li_2O$ is contained as a $Bi_2O_3$—$SiO_2$ system crystal phase and a $Li_2O$—$SiO_2$ system crystal phase.

(4) The low temperature sintering ceramic composition according above 3, wherein the forsterite system crystal phase and/or enststite system crystal phase are contained by 60% or more of a total volume of the ceramic.

(5) The low temperature sintering ceramic composition according to any one of above 1 to 4, wherein a Qf value is 10, 000 or more.

(6) An electronic component comprising a wiring pattern on the low temperature sintering ceramic composition according to any one of above 1 to 5.

(7) The electronic component according to above 6, wherein the wiring is formed by sintering a conductive paste containing at lease one metal selected from Ag, Au and Cu.

(8) A method of fabricating a low temperature sintering ceramic composition comprising:

molding a raw material powder containing one or both of a mixture of MgO and $SiO_2$ that contains MgO and $SiO_2$ at a molar ratio in the range of from 2:1 to 2:3.5 and a complex oxide thereof in the range of from 64.0 to 99.2% by mass, $Bi_2O_3$ in the range of from 0.4 to 33.0% by mass and $Li_2O$ in the range of from 0.4 to 3.0% by mass into a predetermined shape followed by sintering at a temperature in the range of from 850 to 1000° C.

(9) The method according to above 8, wherein the raw material powders are fine powders having a particle size of 2.0 μm or less.

DETAILED DESCRIPTION OF THE INVENTION (A) Porcelain Composition

A low temperature sintering ceramic composition according to the invention is a low temperature sintering ceramic composition in which MgO and $SiO_2$ are contained in sum total in the range of from 64.0 to 99.2% by mass, $Bi_2O_3$ is contained in the range of from 0.4 to 33.0% by mass and $Li_2O$ is contained in the range of from 0.4 to 3.0% by mass; wherein MgO and $SiO_2$ are contained at a molar ratio of MgO to $SiO_2$ in the range of from 2:1 to 2:3.5 and at least part thereof is contained as a complex oxide of Mg and Si.

When $Bi_2O_3$ and $Li_2O$ are contained in the complex oxide that contains Mg and Si, during heating, a $Bi_2O_3$—$SiO_2$ system liquid phase and $Li_2O$—$SiO_2$ system liquid phase are formed, and through a liquid phase reaction thereof, the sintering can be performed at a temperature in the range of substantially from 850 to 1000° C.

The low temperature sintering ceramic composition according to the invention contains MgO and $SiO_2$ in sum total in the range of from 64.0 to 99.2% by mass and preferably in the range of from 75 to 98% by mass; $Bi_2O_3$ in the range of from 0.4 to 33.0% by mass and preferably in the range of from 1.5 to 24.5% by mass; and $Li_2O$ in the range of from 0.4 to 3.0% by mass and preferably in the range of from 0.5 to 3.0% by mass (100% by mass in sum total).

When MgO and $SiO_2$ are contained less than necessary, the high Qf characteristics due to these primary phases thereof are damaged. On the other hand, when these are contained more than necessary, the low temperature sintering properties are lost. When $Bi_2O_3$ is contained less than necessary, the low temperature sintering properties cannot be realized. Furthermore, when it is contained more than necessary, in addition to the bulk density becoming 4 g/cm³ or more, since $2Bi_2O_3.3SiO_2$ becomes a primary phase, the dielectric constant becomes unfavorably high. When $Li_2O$ is contained less than necessary, the low temperature sintering properties cannot be realized. Still furthermore, when it is contained more than necessary, the dielectric loss in a high frequency region of 17 GHz becomes such high as $10 \times 10^{-4}$ or more; accordingly, a high Qf value cannot be realized.

MgO and $SiO_2$ are contained at a molar ratio of MgO to $SiO_2$ in the range of from 2:1 to 2:3.5. When the molar ratio of MgO/$SiO_2$ is either less than 2/3.5 or more than 2/1, the sintering properties deteriorate; that is, the ceramic cannot be densified. A preferable range is from 2:1.5 to 2:3.0.

A complex oxide of Mg and Si may be any one as far as the molar ratio of MgO to $SiO_2$ satisfies the above range; however, a complex oxide that satisfies $1 \leq n \leq 2$ when expressed by n MgO $SiO_2$ is made a primary component. A complex oxide crystal at n=2 ($2MgO.SiO_2$) is known as forsterite and one at n=1 is known as enstatite.

Accordingly, the low temperature sintering ceramic according to the invention, while primarily containing a forsterite system crystal phase and/or an enstatite system crystal phase, is further constituted mainly of a $Bi_2O_3.SiO_2$ system crystal phase and a $Li_2O$—$SiO_2$ system crystal phase. Here, the "forsterite system crystal phase" denotes forsterite and crystal phases similar to this and may contain the same type of crystal phases constituted of the components of the ceramic composition (for instance, $Li_2MgSiO_4$). The situations are similar also to an enstatite system crystal phase, a $Bi_2O_3$—$SiO_2$ system crystal phase and a $Li_2O$—$SiO_2$ system crystal phase.

The specific molar ratios of the respective phases, as far as target values of the physical properties can be realized, are not restricted; however, ordinarily, the forsterite system crystal phase and/or enststite system crystal phase are contained by 60% or more of a total volume of the ceramic, preferably by 80% or more, more preferably by 90% or more and still more preferably by 95% or more.

Furthermore, as far as the effect of the invention is not damaged, a $SiO_2$ system crystal phase and so on and an amorphous phase and so on may be contained.

The low temperature sintering ceramic according to the invention has the Qf value of 10,000 or more and can be densified to the bulk density ratio (relative value obtained by dividing the observed density with the theoretical density calculated for a completely dense material) of 95% or more by sintering in the temperature range of from 850 to 1000° C.

(B) Method of Fabricating Low Temperature Sintering Ceramic

The low temperature sintering ceramic according to the invention can be fabricated by molding a raw material powder in which a mixture of MgO and $SiO_2$ in which MgO and $SiO_2$ are contained at a molar ratio of from 2:1 to 2:3.5 and/or a complex oxide thereof is contained in the range of from 64.0 to 99.2% by mass, $Bi_2O_3$ is contained in the range of from 0.4 to 33.0% by mass and $Li_2O$ is contained in the range of from 0.4 to 3.0% by mass into a predetermined shape followed by sintering at a temperature in the range of from 850 to 1000° C.

Mg and $SiO_2$ that are primary raw materials may be a mixture of the respective metal oxides or a mixture obtained by adding a necessary amount of $SiO_2$ and MgO to a complex oxide such as forsterite ($2MgSiO_2$). MgO and $SiO_2$ that can be used as starting raw materials can be added, other than in the form of oxide powder of the respective metals, also in the form of carbonates, acetates, nitrates and so on that can form oxide in the course of the sintering.

To the above raw material of primary components, $Bi_2O_3$ powder and $Li_2O$ powder as the sintering aide are added by the above ratio, preferably, so that the primary components raw material may be contained in the range of from 75 to 98% by mass; $Bi_2O_3$ in the range of from 1.5 to 24.5% by mass; and $Li_2O$ in the range of from 0.5 to 3.0% by mass, followed by mixing. $Bi_2O_3$ and $Li_2O$ also can be added, other than in the form of oxide powder of the respective metals, in the form of carbonates, acetates, nitrates and so on that can form an oxide in the course of the sintering.

Raw material powders of $Mg_2SiO_4$, $SiO_2$, MgO, $Bi_2O_3$, $Li_2O$ and so on, in order to heighten the dispersibility thereof and to obtain desirable dielectric constant and low dielectric loss, are preferably rendered fine powders of 2.0 μm or less, particularly 1.0 μm or less.

The powder mixture obtained by adding at the above ratio followed by mixing, after a binder is appropriately added, is molded into an arbitrary shape by means of such as a metal mold pressing, extrusion molding, doctor blade method, rolling and so on, sintered in an oxygen atmosphere or a no-oxidizing atmosphere of such as $N_2$, Ar and so on at a temperature in the range of from 850 to 1000° C., particularly from 850 to 950° C. for from 1 to 3 hr, and thereby high bulk density ratio of 95% or more can be obtained. When the sintering temperature at this time is lower than 850° C., the ceramic cannot be sufficiently densified; on the other hand, when it exceeds 1000° C., though the densification can be attained, low melting point conductors such as Ag, Au, Cu and so on become difficult to use as the wiring material.

According to the method according to the invention, a more active reaction is generated between a solid phase that is a complex oxide of Mg and Si and a liquid phase of $Bi_2O_3$—$SiO_2$ and $Li_2O$—$SiO_2$ systems; as a result, the ceramic can be densified with a slight amount of sintering aide. Accordingly, an amount of an amorphous phase in grain boundary that causes an increase in the dielectric loss can be suppressed to the minimum amount. As mentioned above, according to the fabricating method according to the invention, in the ceramic, at least the forsterite system crystal phase and/or enstatite system crystal phase that contains Mg and Si, the $Bi_2O_3$—$SiO_2$ system crystal phase and the $Li_2O$—$SiO_2$ system crystal phase can be precipitated, and thereby, the dielectric constant can be controlled to 9 or less even at substantially 17 GHz and a ceramic for use in high frequency that is low in the dielectric loss, accordingly, high in the Qf value can be obtained.

(C) Applications of Ceramic Composition

The ceramic composition according to the invention can be sintered at a temperature in the range of from 850 to 1000° C.; accordingly, it can be used as an insulating substrate of a printed wiring board where particularly Ag, Au, Cu and so on are wired. In the case of a printed wiring board being fabricated by use of such ceramic composition, for instance, a powder mixture compounded as mentioned above is formed into a green sheet for use in the formation of insulating layer by means of a known tape formation method such as a doctor blade method, extrusion molding method and so on. Thereafter, on a surface of the green sheet, as a wiring circuit layer, by use of a conductive paste containing at least one kind of metal of Ag, Au and Cu, in particular, Ag powder, a wiring pattern is printed circuit pattern-like according to a screen printing method and so on. Optionally, through holes and via-holes may be formed in the sheet followed by filling them with the above conductive paste. Thereafter, a plurality of green sheets is laminated under pressure followed by sintering under the above conditions, and thereby the wiring layer and the insulating layer can be simultaneously sintered.

Accordingly, the present invention also encompasses electronic components containing these circuits. The wiring pattern may also include a pattern comprising a material other than the materials mentioned above as long as it can be used under the sintering condition. Typical but not limiting examples thereof include a resistor formed of a material having a high-melting point. The electronic component may be composed of these wiring patterns or contain discrete devices mounted thereon.

BEST MODE FOR CARRYING OUT THE INVENTION

In the following, the present invention will be specifically described with Examples and comparative Examples; however, the present invention is not restricted thereto.

EXAMPLES 1 TO 34

$Mg_2SiO_4$, MgO, $SiO_2$, $Bi_2O_3$ and $Li_2CO_3$ each having an average particle diameter of 1 μm or less were blended so that content ratios in terms of oxide might be ratios shown in Table 1 ($Mg_2SiO_4$, MgO, $SiO_2$ are shown in the third and fourth columns in terms of MgO and $SiO_2$ a while $Bi_2O_3$ and $Li_2CO_3$ are shown in the fifth column as "liquid phase" in terms of $Bi_2O_3$ and $Li_2O$. The same as in the following tables.). To each of these mixtures, an organic binder (Denka Butyral #3000-K, product manufactured by DENKI KAGAKU KOGYO KABUSHIKI KAISHA), a plasticizer (butylphthalylbutyl glycolate, manufactured by Wako Pure Chemical Industries Co., Ltd.), and toluene were added followed by preparing a green sheet having a thickness of 150 μm by means of the doctor blade method. Then, five of the green sheets were stacked and subjected to the thermocompression bonding under a pressure of 150 kg/cm² at 70° C. The obtained laminate body, after degreasing by heating the sheets in air at 500° C. so that the organic components may be decomposed and/or and evaporated, was sintered in air under the conditions shown in Table 1, and thereby ceramic for use in a multi-layered substrate was obtained. In Table 1, total contents of Mg and Si in raw material mixtures (in terms of oxide) and $MgO/SiO_2$ ratios are shown together.

The dielectric constant and the dielectric loss were measured of each of the obtained sintered bodies according to the following methods. The measurements were performed according to JIS R1627 "Testing method for dielectric properties of fine ceramics at microwave frequency". That is, the ceramic for use in multi-layered substrate was cut into a disc-like sample a having diameter of from 1 to 5 mm and a thickness of from 2 to 3 mm, both end faces of the disc-like sample were short circuited by use of two parallel conductive plates to form a dielectric resonator. The resonance characteristics and the no-load Q at TE011 mode of the dielectric resonator were measured in the range of from 17 to 20 GHz by use of a network analyzer (Model 8722C manufactured by Hewlett-Packard Corp.) followed by calculating the dielectric constant and the dielectric loss (tan δ) further followed by calculating the Qf value from a measurement frequency and Q (=1/tan δ). Results are shown in Table 2.

Furthermore, by performing X-ray diffractometry of the respective samples and comparing with X-ray diffraction peaks of standard samples to identify constituent phases of the ceramics, the forsterite crystal phase ($2MgSiO_4$) and/or enstatite crystal phase ($MgSiO_4$), the $Bi_2O_3$—$SiO_2$ system crystal phase (typical in eulytite $2Bi_2O_3.3SiO_4$) and a $Li_2O$—$SiO_2$ system crystal phase each were confirmed to be present.

As obvious from the above results, all of the ceramics according to the invention that include MgO, SiO$_2$, Bi$_2$O$_3$ and Li$_2$O in the range of the invention and in which, as crystal phases, the forsterite system crystal phase and/or the enstatite system crystal phase, the Bi$_2$O$_3$—SiO$_2$ system crystal phase, and the Li$_2$O—SiO$_2$ system crystal phase are mainly precipitated exhibit excellent values of the dielectric constant of 9 or less and the Qf value of 10,000 or more. However, when the content of Bi is increased, the bulk density tends to increase and reaches 4.0 at the upper limit of Bi that is 33.0% by mass in the invention (Example 33).

A sample where Bi$_2$O$_3$ and Li$_2$O were not added could not be sintered at low temperatures (Comparative Example 1), and a sample where Bi$_2$O$_3$ was added by less than 0.4% by mass (Comparative Example 10) and samples where Li$_2$O was added by less than 0.4% by mass (Comparative Examples 3 through 7) were not sintered at a sintering temperature in range of the present invention. When the amount of Li$_2$O exceeds 3.0% by mass, the dielectric loss becomes large and the Qf value becomes less than 10,000. Samples where the MgO/SiO$_2$ ratio exceeds 2/1 (Comparative Examples 8 and 9) could not be sintered at a sintering temperature in range or the present invention.

TABLE 1

| No. | | Composition ratio | Composition (molar ratio) MgO | Composition (molar ratio) SiO$_2$ | Composition (% by mass) MgO | Composition (% by mass) SiO$_2$ | Liquid phase (% by mass) Bi$_2$O$_3$ | Liquid phase (% by mass) Li$_2$O | Sintering temperature (° C.) | Holding time (hr) |
|---|---|---|---|---|---|---|---|---|---|---|
| Example | 1 | 93 | 2 | 1 | 53.3 | 39.7 | 5.00 | 2.00 | 883 | 1 |
| | 2 | 93 | 2 | 1.5 | 43.9 | 49.1 | 5.00 | 2.00 | 883 | 1 |
| | 3 | 95 | 2 | 1.5 | 44.8 | 50.2 | 3.57 | 1.43 | 883 | 1 |
| | 4 | 91 | 2 | 1.5 | 43.0 | 48.0 | 6.43 | 2.57 | 883 | 1 |
| | 5 | 93 | 2 | 2 | 37.3 | 55.7 | 5.00 | 2.00 | 883 | 1 |
| | 6 | 95 | 2 | 2 | 38.1 | 56.9 | 4.50 | 0.50 | 904 | 1 |
| | 7 | 95 | 2 | 2 | 38.1 | 56.9 | 4.00 | 1.00 | 904 | 1 |
| | 8 | 94 | 2 | 2 | 37.7 | 56.3 | 4.50 | 1.50 | 910 | 1 |
| | 9 | 93.5 | 2 | 2 | 37.5 | 56.0 | 4.50 | 2.00 | 910 | 1 |
| | 10 | 94.5 | 2 | 2 | 37.9 | 56.6 | 5.00 | 0.50 | 950 | 1 |
| | 11 | 93.5 | 2 | 2 | 37.5 | 56.0 | 6.00 | 0.50 | 950 | 1 |
| | 12 | 92.5 | 2 | 2 | 37.1 | 55.4 | 7.00 | 0.50 | 950 | 1 |
| | 13 | 93 | 2 | 2.5 | 32.5 | 60.5 | 5.00 | 2.00 | 883 | 1 |
| | 14 | 95 | 2 | 2.5 | 33.2 | 61.8 | 4.00 | 1.00 | 885 | 1 |
| | 15 | 95 | 2 | 2.5 | 33.2 | 61.8 | 3.00 | 2.00 | 885 | 1 |
| | 16 | 93 | 2 | 2.5 | 32.5 | 60.5 | 6.50 | 0.50 | 954 | 1 |
| | 17 | 91 | 2 | 2.5 | 31.8 | 59.2 | 8.50 | 0.50 | 954 | 1 |
| | 18 | 93 | 2 | 3 | 28.7 | 64.3 | 5.00 | 2.00 | 883 | 1 |
| | 19 | 95 | 2 | 1.5 | 44.8 | 50.2 | 4.50 | 0.50 | 961 | 1 |
| | 20 | 95 | 2 | 1.5 | 44.8 | 50.2 | 4.00 | 1.00 | 961 | 1 |
| | 21 | 95 | 2 | 1.3 | 48.2 | 46.8 | 4.00 | 1.00 | 885 | 1 |
| | 22 | 85 | 2 | 2 | 34.1 | 50.9 | 14.50 | 0.50 | 950 | 1 |
| | 23 | 90 | 2 | 2 | 36.1 | 53.9 | 9.50 | 0.50 | 950 | 1 |
| | 24 | 98 | 2 | 2 | 39.3 | 58.7 | 1.50 | 0.50 | 950 | 1 |
| | 25 | 97.5 | 2 | 2 | 39.1 | 58.4 | 1.50 | 1.00 | 893 | 1 |
| | 26 | 97 | 2 | 2 | 38.9 | 58.1 | 2.50 | 0.50 | 955 | 1 |
| | 27 | 96.5 | 2 | 2 | 38.7 | 57.8 | 2.50 | 1.00 | 893 | 1 |
| | 28 | 80 | 2 | 2 | 32.1 | 47.9 | 19.50 | 0.50 | 893 | 1 |
| | 29 | 75 | 2 | 2 | 30.1 | 44.9 | 24.50 | 0.50 | 893 | 1 |
| | 30 | 95 | 2 | 3 | 29.3 | 65.7 | 4.00 | 1.00 | 890 | 1 |
| | 31 | 95 | 2 | 3.5 | 26.3 | 68.7 | 4.00 | 1.00 | 890 | 1 |
| | 32 | 69.5 | 2 | 2 | 27.9 | 41.6 | 30.00 | 0.50 | 908 | 1 |
| | 33 | 66.5 | 2 | 2 | 26.7 | 39.8 | 33.00 | 0.50 | 908 | 1 |
| | 34 | 98.5 | 2 | 2 | 39.5 | 59.0 | 0.50 | 1.00 | 959 | 1 |
| Comparative Example | 1 | 100 | 2 | 1 | 57.3 | 42.7 | 0.00 | 0.00 | 1402 | 3 |
| | 2 | 89 | 2 | 1.5 | 42.0 | 47.0 | 7.86 | 3.14 | 883 | 1 |
| | 3 | 95 | 2 | 2 | 38.1 | 56.9 | 5.00 | 0.00 | 910 | 1 |
| | 4 | 95 | 2 | 2.5 | 33.2 | 61.8 | 4.75 | 0.25 | 954 | 1 |
| | 5 | 94 | 2 | 2.5 | 32.8 | 61.2 | 5.75 | 0.25 | 954 | 1 |
| | 6 | 95 | 2 | 2 | 38.1 | 56.9 | 4.70 | 0.30 | 950 | 1 |
| | 7 | 95 | 2 | 2 | 38.1 | 56.9 | 4.90 | 0.10 | 950 | 1 |
| | 8 | 95 | 2 | 0.8 | 59.5 | 35.5 | 4.00 | 1.00 | 943 | 1 |
| | 9 | 94 | 2 | 0.8 | 58.9 | 35.1 | 4.00 | 2.00 | 943 | 1 |
| | 10 | 98.7 | 2 | 2 | 39.6 | 59.1 | 0.30 | 1.00 | 959 | 1 |

COMPARATIVE EXAMPLES 1 TO 10

Mg$_2$SiO$_4$, MgO, SiO$_2$, Bi$_2$O$_3$ and Li$_2$CO$_3$ each having an average particle diameter of 1 μm or less were blended so that compositions in terms of oxide may be ratios shown in Table 1. These compositions were sintered similarly to Examples 1 through 34 under the conditions shown in Table 1, and thereby ceramics for use in multi-layered substrate were obtained. Results are collectively shown in Table 2.

TABLE 2

| No. | | Bulk density (g/cm$^3$) | Frequency (GHz) | Dielectric constant | Q | Qf |
|---|---|---|---|---|---|---|
| Example | 1 | 3.18 | 18.2 | 6.98 | 707 | 12862 |
| | 2 | 3.25 | 17.9 | 7.17 | 789 | 14125 |
| | 3 | 3.23 | 17.9 | 7.15 | 794 | 14218 |

TABLE 2-continued

| No. | Bulk density (g/cm³) | Frequency (GHz) | Dielectric constant | Q | Q f |
|---|---|---|---|---|---|
| 4 | 3.24 | 17.9 | 7.20 | 575 | 10284 |
| 5 | 3.24 | 17.9 | 7.20 | 952 | 17048 |
| 6 | 3.15 | 18.3 | 6.84 | 3374 | 61748 |
| 7 | 3.24 | 18.4 | 7.15 | 1115 | 20516 |
| 8 | 3.24 | 18.5 | 7.12 | 604 | 11174 |
| 9 | 3.24 | 18.8 | 7.17 | 539 | 10124 |
| 10 | 3.24 | 19.5 | 6.98 | 2725 | 53128 |
| 11 | 3.24 | 20.0 | 6.98 | 2332 | 46644 |
| 12 | 3.22 | 20.1 | 6.96 | 1101 | 22120 |
| 13 | 3.17 | 18.2 | 6.80 | 921 | 16759 |
| 14 | 3.15 | 18.3 | 6.72 | 1220 | 22326 |
| 15 | 3.07 | 18.3 | 6.67 | 947 | 17330 |
| 16 | 3.11 | 19.9 | 6.62 | 1007 | 20031 |
| 17 | 3.14 | 19.8 | 6.76 | 973 | 19257 |
| 18 | 3.13 | 18.5 | 6.50 | 861 | 15934 |

TABLE 2-continued

| | No. | Bulk density (g/cm³) | Frequency (GHz) | Dielectric constant | Q | Q f |
|---|---|---|---|---|---|---|
| | 19 | 3.17 | 18.8 | 6.87 | 3559 | 66902 |
| | 20 | 3.16 | 19.1 | 6.91 | 1012 | 19322 |
| | 21 | 3.21 | 18.5 | 6.92 | 1230 | 22748 |
| | 22 | 3.49 | 18.9 | 7.51 | 2287 | 43227 |
| | 23 | 3.37 | 18.8 | 7.28 | 2551 | 47950 |
| | 24 | 3.07 | 19.6 | 6.68 | 1902 | 37284 |
| | 25 | 3.13 | 18.5 | 6.87 | 1343 | 24789 |
| | 26 | 3.16 | 18.4 | 6.96 | 1729 | 31792 |
| | 27 | 3.17 | 18.8 | 6.88 | 586 | 11043 |
| | 28 | 3.64 | 17.8 | 7.79 | 2176 | 38659 |
| | 29 | 3.77 | 17.5 | 8.07 | 2117 | 36944 |
| | 30 | 3.10 | 18.4 | 6.42 | 1105 | 20368 |
| | 31 | 3.04 | 18.6 | 6.21 | 973 | 18099 |
| | 32 | 3.88 | 16.9 | 8.43 | 2401 | 40549 |
| | 33 | 4.00 | 16.8 | 8.59 | 2304 | 38707 |
| | 34 | 3.12 | 18.9 | 6.95 | 814 | 15428 |
| Comparative Example | 1 | 2.99 | 20.7 | 6.41 | 8091 | 167484 |
| | 2 | 3.26 | 17.9 | 7.26 | 462 | 8275 |
| | 3 | Un-sintered | — | — | — | — |
| | 4 | Un-sintered | — | — | — | — |
| | 5 | Un-sintered | — | — | — | — |
| | 6 | Un-sintered | — | — | — | — |
| | 7 | Un-sintered | — | — | — | — |
| | 8 | Un-sintered | — | — | — | — |
| | 9 | Un-sintered | — | — | — | — |
| | 10 | Un-sintered | — | — | — | — |

COMPARATIVE EXAMPLES 11 TO 12

A composition prepared similarly to Example 6 except for the use of B instead of Bi was sintered at 953° C. and found it could not be sintered at 1 hr sintering. Furthermore, when a composition prepared similarly to Example 8 except for the use of B instead of Bi was sintered at 953° C. for 1 hr, the obtained ceramic composition exhibited enough low dielectric constant such as 6.86; however, the Q value at 18.8 GHz was 410 and the Qf value (7716.3) was less than 10,000. Specific compositions and results are shown in Tables 3 and 4.

TABLE 3

| Composition No. | Composition ratio | Composition (molar ratio) MgO | Composition (molar ratio) SiO₂ | Composition (% by mass) MgO | Composition (% by mass) SiO₂ | Liquid phase (% by mass) B₂O₃ | Liquid phase (% by mass) Li₂O |
|---|---|---|---|---|---|---|---|
| Comparative Example 11 | 95 | 2 | 2 | 38.1 | 56.9 | 4.5 | 0.5 |
| Comparative Example 12 | 94 | 2 | 2 | 37.7 | 56.3 | 4.5 | 1.5 |

TABLE 4

| No. | Sintering Temperature (° C.) | Holding Time (hr) | Bulk Density (g/cm³) | Frequency (GHz) | Dielectric constant | Q | Qf |
|---|---|---|---|---|---|---|---|
| Comparative Example 11 | 953 | 1 | Un-sintered | — | — | — | — |
| Comparative Example 12 | 953 | 1 | 3.03 | 18.8 | 6.86 | 410 | 7716 |

INDUSTRIAL APPLICABILITY

As detailed above, the low temperature sintering ceramic composition according to the invention, as a result of the use of oxides of Bi and Li as a liquid phase formation component, realized the low temperature sintering properties in the ceramic composition that was mainly constituted of the forsterite system crystal phase and/or enstatite system crystal phase. Furthermore, it was found that even when $Bi_2O_3$ was introduced much, the dielectric loss was not deteriorated, and thereby a high Qf value could be realized. Accordingly, the ceramic composition according to the invention, being most suitable as a low loss LTCC (low temperature co-firing ceramics) material that has the dielectric constant (9 or less) and high Qf (10,000 or more) that can be utilized in a high frequency region of 17 GHz or more, can be used in various kinds of microwave circuit elements and so on. Furthermore, the ceramic composition can be sintered at a temperature in the range of from 850 to 1000° C.; accordingly, wiring made of Cu, Au, Ag and so on can be formed according to co-firing.

The invention claimed is:

1. A low temperature sintering ceramic composition containing Mg, Si, Bi and Li as constituent elements, wherein the composition comprises
    MgO and $SiO_2$ in sum total in the range of from 64.0 to 99.2% by mass;
    $Bi_2O_3$ in the range of from 0.4 to 33.0% by mass;
    $Li_2O$ in the range of from 0.4 to 3.0% by mass; and
    MgO and $SiO_2$ are contained in the molar ratio of from 2:1 to 2:3.5, at least part thereof being contained as a complex oxide of Mg and Si.

2. The low temperature sintering ceramic composition according to claim 1, wherein the composition comprises
    MgO and $SiO_2$ in sum total in the range of from 75.0 to 98.0% by mass;

$Bi_2O_3$ in the range of from 1.5 to 24.5% by mass; and
$Li_2O$ in the range of from 0.5 to 3.0% by mass.

3. The low temperature sintering ceramic composition according to claim 1, wherein the complex oxide is a forsterite system crystal phase; and at least part of $Bi_2O_3$ and $Li_2O$ is contained as a $Bi_2O_3$—$SiO_2$ system crystal phase and a $Li2O$—$SiO_2$ system crystal phase.

4. The low temperature sintering ceramic composition according to claim 3, wherein the forsterite system crystal phase is contained by 60% or more of a total volume of the ceramic.

5. The low temperature sintering ceramic composition according to claim 1, wherein a Qf value is 10,000 or more.

6. An electronic component comprising a wiring pattern on the low temperature sintering ceramic composition according to claim 1.

7. The electronic component according to claim 6, wherein the wiring is formed by sintering a conductive paste containing at least one metal selected from Ag, Au and Cu.

8. A method of fabricating a low temperature sintering ceramic composition comprising:

molding a raw material powder containing one or both of a mixture of MgO and $SiO_2$ that contains MgO and $SiO_2$ at a molar ratio in the range of from 2:1 to 2:3.5 and a complex oxide thereof in the range of from 64.0 to 99.2% by mass, $Bi_2O_3$ in the range of from 0.4 to 33.0% by mass and $Li_2O$ in the range of from 0.4 to 3.0% by mass into a predetermined shape followed by sintering at a temperature in the range of from 850 to 1000° C.

9. The method according to claim 8, wherein the raw material powders are fine powders having a particle size of 2.0 μm or less.

10. The low temperature sintering ceramic composition according to claim 1, wherein the complex oxide is a enstatite system crystal phase; and at least part of $Bi_2O_3$ and $Li_2O$ is contained as a $Bi_2O_3$—$SiO_2$ system crystal phase and a $Li_2O$—$SiO_2$ system crystal phase.

11. The low temperature sintering ceramic composition according to claim 3, wherein the enststite system crystal phase is contained by 60% or more of a total volume of the ceramic.

* * * * *